(12) United States Patent
Kuo et al.

(10) Patent No.: US 7,535,638 B2
(45) Date of Patent: *May 19, 2009

(54) FRACTIONAL COVERAGE LOUVER DEVICE FOR A LIGHT GUIDE SCREEN

(75) Inventors: Huei Pei Kuo, Palo Alto, CA (US); Lawrence M. Hubby, Jr., Palo Alto, CA (US); Steven L. Naberhuis, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

This patent is subject to a terminal disclaimer.

(21) Appl. No.: 11/263,816

(22) Filed: Nov. 1, 2005

(65) Prior Publication Data

US 2007/0097690 A1    May 3, 2007

(51) Int. Cl.
*G03B 21/56* (2006.01)
*F21V 11/02* (2006.01)
*F21V 7/00* (2006.01)

(52) U.S. Cl. .............. 359/460; 362/291; 362/342; 385/901

(58) Field of Classification Search ........... 359/443, 359/460, 459; 362/290–292, 559, 560, 342, 362/354; 385/901; 349/66
See application file for complete search history.

(56) References Cited

U.S. PATENT DOCUMENTS

| 4,066,332 | A  | * | 1/1978 | Kato et al. ............ 359/453 |
| 4,929,048 | A  |   | 5/1990 | Cuypers |
| 6,185,038 | B1 | * | 2/2001 | Yamaguchi et al. ...... 359/457 |
| 6,550,937 | B2 |   | 4/2003 | Glass |
| 6,571,043 | B1 |   | 5/2003 | Lowry et al. |
| 2004/0165261 | A1 | * | 8/2004 | Sekiguchi ............ 359/457 |
| 2006/0176554 | A1 | * | 8/2006 | Kuo et al. ............ 359/460 |
| 2006/0209433 | A1 | * | 9/2006 | Naberhuis et al. ...... 359/802 |
| 2007/0097707 | A1 | * | 5/2007 | Kuo et al. ............ 362/615 |

* cited by examiner

*Primary Examiner*—Christopher Mahoney (57) ABSTRACT

In a particular embodiment, the fractional coverage louver device includes a transparent layer of material having a first surface and a second surface parallel thereto. A plurality of louver members disposed within the transparent layer of material provide fractional reflective coverage across the width of the transparent material. The louver members are aligned to receive light entering the first surface at a shallow angle relative to the first surface and direct the light out the second surface at a high angle relative to the second surface, thereby increasing the angular viewing range. Transparent areas between louver members allow a portion of incident ambient light to pass through the louver device without being reflected back to a viewer. As such, the louver device has advantageous contrast properties.

26 Claims, 7 Drawing Sheets

FRACTIONAL COVERAGE LOUVER DEVICE FOR A LIGHT GUIDE SCREEN

RELATED APPLICATIONS

This application is related to commonly owned and recently allowed U.S. Patent Application identified by publication number 2005-0093814, filed on Oct. 31, 2003 as application Ser. No. 10/698,829 by inventors Huei Pei Kuo, Lawrence M. Hubby, Jr. and Steven L. Naberhuis and entitled "Light Guide Apparatus For Use In Rear Projection Display Environments," herein incorporated by reference.

FIELD

This invention relates generally to the field of display devices and, in particular, to a louver device for a light guide screen.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at two hundred pounds or more it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A display may also have to contend with two types of contrast—dark room contrast and light room contrast. Dark room contrast is simply the ratio between the intensity of light and dark image objects in a dark environment such as a theater setting. Light room contrast is similarly the ratio between the intensity of light and dark image objects in a light environment. Front projection systems typically provide good dark room contrast where ambient light is minimized but, as they rely on a screen reflector, they are subject to poor light room contrast due to the interference of ambient light.

Rear projection displays, LEDs, LCDs and PDPs typically provide better light room contrast than front projection systems. However, ambient light striking the viewing surface can be an issue for viewers and buying consumers. Ambient light is oftentimes highly variable. For typical consumers, what makes a display attractive is often high contrast in a bright room.

A developing variation of rear projection displays utilizes light guides, such as optical fibers, to route an image from an input location to an output location and magnify the image. Such displays may be referred to as light guide screens (LGSs). In certain configurations; however, light guide screens may lose a percentage of light and, thus, the brightness of the image, by permitting the light to venture off in directions other than substantially towards the viewing audience. This loss of light may in some instances amount to fifty percent (50%) of the light provided to the input ends of the light guides.

In addition, in some configurations, the viewing angle of the complete screen may be limited to the angular range corresponding to the acceptance angle of the light guides used in construction of the screen. With respect to light guides, the acceptance angle is the half-angle of the cone within which incident light is totally internally reflected by the fiber core. Further, this range of viewing angles may not be directed out in front of the screen toward the viewer, but may be more heavily concentrated to the right, left, top or bottom, depending on the direction the light guides approach the screen from behind.

As with other front or rear projection systems, in some configurations ambient light may be an issue as it may reflect back from the light guide screen and reduce the contrast levels of the intended picture. Although a common issue with other projection systems, it is often none the less an annoyance to the viewer.

Weight, thickness, durability, cost, aesthetic appearance, and quality are key considerations for rear projection display systems and display screens. As such, there is a need for reducing the loss of light that is likely with a light guide screen.

Hence, there is a need for a device that overcomes one or more of the drawbacks identified above.

SUMMARY

This invention provides a fractional coverage louver device for a light guide screen.

In particular and by way of example only, according to an embodiment, provided is a fractional coverage louver device for a light guide screen, including: a transparent layer of material having a first surface and, parallel thereto, a second surface and a width therebetween; and a plurality of louver members disposed within the transparent layer of material, each louver member having a first end and a second end, the first end adjacent to the first surface, the second end proximate to the second surface and defining a space between the second end and the second surface.

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types light guide screen display systems.

Figure 1:
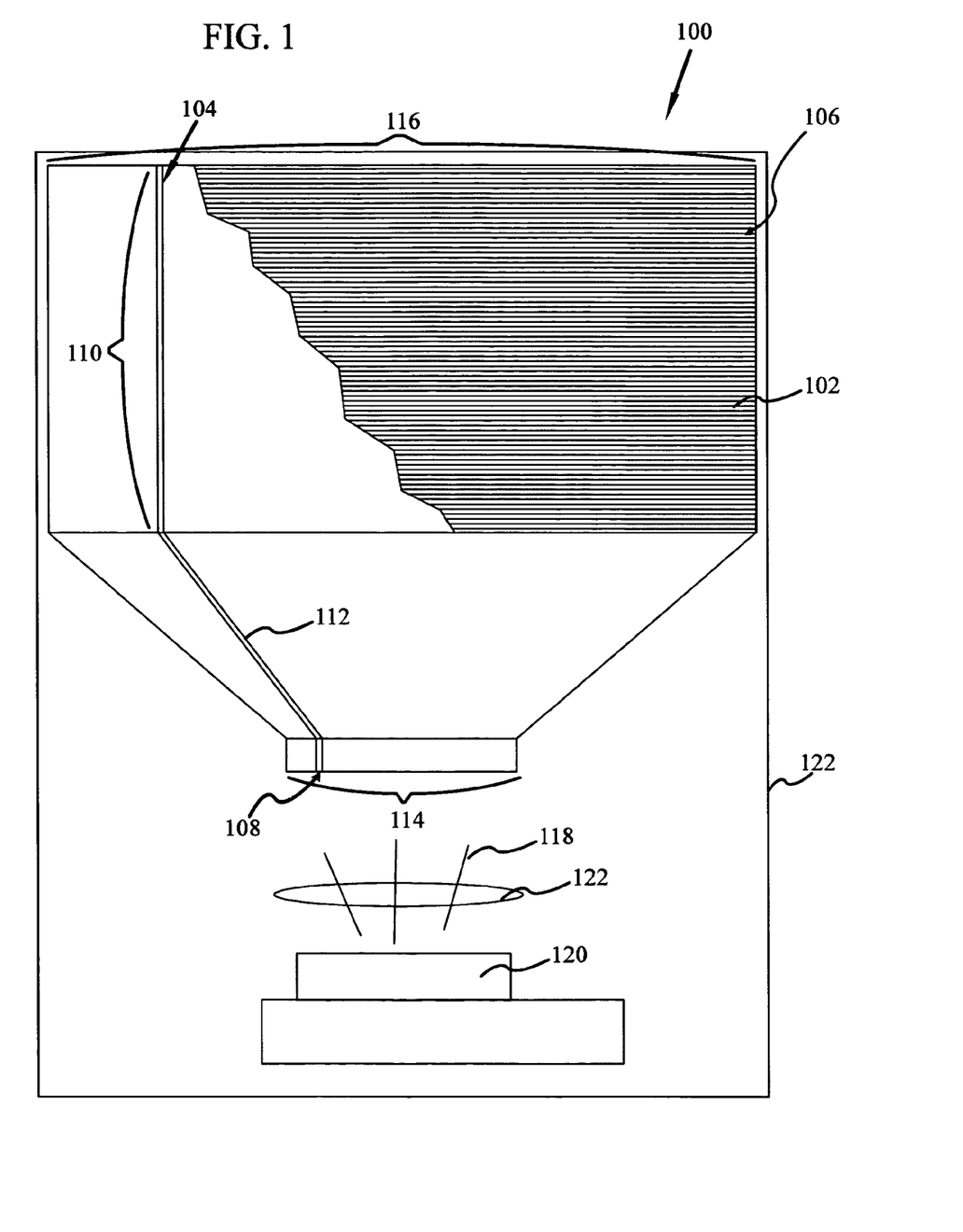
FIG. 1 shows a schematic diagram of a light guide screen with a fractional coverage louver device according to an embodiment.

FIG. 1 conceptually illustrates a portion of a light guide screen (LGS) 100 with a fractional coverage louver device 102 having a plurality of louver members providing fractional coverage as further described below. In at least one embodiment, LGS 100 has a plurality of aligned magnifying layers 104 providing a viewing surface 106. Specifically, the magnifying layers 104 each provide an input location 108, a magnifying output location 110 and, in at least one embodiment, a flexible midsection 112.

In at least one embodiment as shown, each magnifying layer 104 provides one vertical slice of the viewing surface 106. In an alternative embodiment, not shown, each magnifying layer 104 provides one horizontal slice of the viewing surface 106.

In at least one embodiment, collectively, input locations 108 of each magnifying layer 104 provide input surface 114. Collectively, output locations 110 of each magnifying layer 104 provide output face 116.

An image (e.g., in the form of light 118) is projected upon input surface 114. Such an image may be provided in at least one embodiment by an image source 120, proximate to input surface 114. A lens 122 may optically couple the image source 120 to the input surface 114, or the lens 122 may be an integral part of the image source 120.

Image source 120 may be any device capable of providing a visual image, such as, for example, a projector. Image source 120 is not limited simply to this example, and may also include combinations of devices. For example, multiple light/image sources (such as red, green and blue illuminated liquid crystal light valves) may be used as well. As is further discussed below, the image focused upon the input surface 114 is expanded to appear upon the viewing surface 106. In at least one embodiment, magnifying layers 104, and image source 120 are disposed within a case 120.

Figure 2:
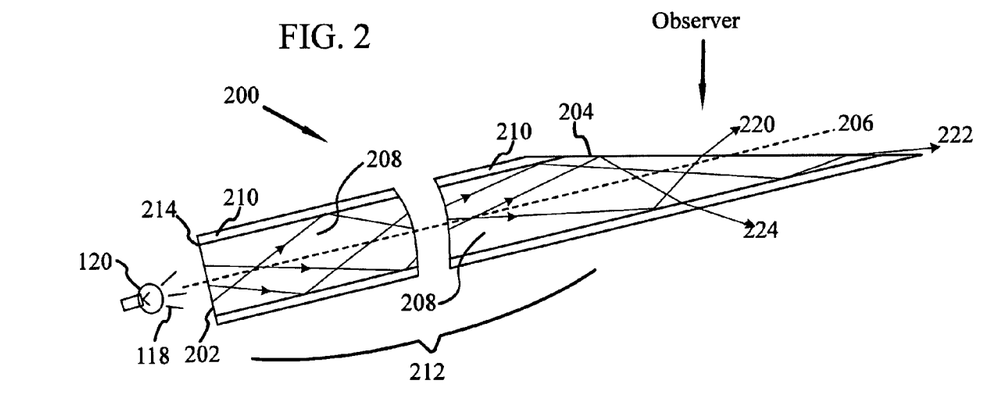
FIG. 2 shows a partial cross-sectional view of a light guide element.

FIG. 2 conceptually illustrates a cross-section of a single light guide 200, having an input end 202 and an output end 204. As shown, input end 202 may be substantially perpendicular to longitudinal centerline 206. Output end 204 is at an acute angle relative to the longitudinal centerline 206. In other words, output end 204 is beveled. As such, the dimension of the output end 204 in the plane of the paper is longer than the input end 104.

It is understood and appreciated that light guides 200 as used herein are cladded light guides. Each light guide 200 consists of a core 208 that is substantially optically clean and a circumferential cladding 210. The core has an index of refraction n1, and the clad has an index of refraction n2, wherein n1>n2. Further, in at least one embodiment, the midsection 212 of light guide 200 is a flexible midsection.

In at least one embodiment, each light guide 200 is preferably substantially totally internally reflecting such that the light, illustrated as lines 220~224, received at the input end 202 is substantially delivered to the magnifying output end 204 with minimal loss. Total internal reflection, or TIR, is the reflection of all incident light off a boundary between clad 210 and core 208. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of ninety degrees (90°)—that is, the light propagates along the boundary—when the light impinges on the boundary from the side of higher index of refraction. For any angle of incidence greater than the critical angle, the light traveling through the medium with a higher index of refraction will undergo total internal reflection. The value of the critical angle depends upon the combination of materials present on each side of the boundary.

The use of light guides 200 with TIR qualities is generally advantageous permitting, for example, selection of the length of the light guides 200 and location of the input end to minimize thickness of the light guide screen and/or improve service access to light source without substantially diminishing the quantity of light delivered by each light guide 200 to output end 204, and consequently the viewing surface 106.

Figure 3:
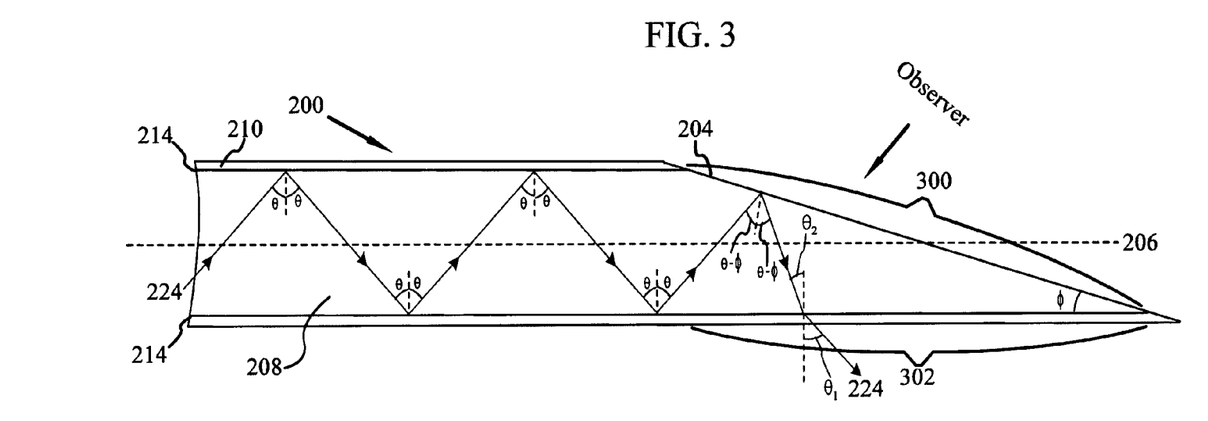
FIG. 3 shows an enlarged view of the light guide element in FIG. 2.

FIG. 3 is an enlarged portion of light guide 200 provided to further illustrate the possible propagation of a light ray 224. Light ray 224 travels in light guide 200 through successive TIR, as shown in FIG. 3. The angle of incidence and reflection remains unchanged at angle θ. When the light ray 224 enters the tapered section of output end 204, the incident angle decreases by Φ at each successive TIR. After x bounces into the tapered section, the incident angle becomes $\theta_2=\theta-x\Phi$.

When $\theta_2$ becomes less than the critical angle, light ray 224 exits the light guide 200 at an angle $\theta_1$, where $\theta_1$ is defined by the following equations, wherein $n_2$ is the index of refraction of the core and $n_1$ is the index of refraction for the clad:

$n_2 > n_1$ $\theta_2 < \theta_1$ $n_2 \sin \theta_2 = n_1 \sin \theta_1$

Typically, $\theta_1 > 60°$ and light ray 224 can exit either from front surface 300 of output end 204 or the back surface 302 of output end 204. When viewed from a direction perpendicular to output end 204, the light ray 224 exiting back surface 302 cannot reach the observer and is wasted.

Within a typical light guide 200 such as, for example, an optical fiber, the spread of light to either side of longitudinal centerline 206 is typically about thirty degrees (30°). Although the angle of output end 204 may provide a flat surface transverse to an observer, exiting light will continue substantially in the direction last suggested by longitudinal centerline 206 unless reflected or refracted at output end 204.

With respect to FIGS. 2 and 3, as an observer is generally viewing the light guide screen from a position transverse to the output end, light rays 222 and 224 clearly do not reach the observer. Of the three light rays illustrated, only light ray 220 is traveling most generally towards the viewing observer. For ease of illustration and understanding the light rays 222 and 224 are shown as following generally straight paths entering or leaving the light guide 200. It is to be understood and appreciated that the light rays 222 and 224 undergo a change of direction governed by the Fresnel law of refraction at the interfaces. This slight change in direction is well understood and does not alter the advantageous features of the disclosed embodiments.

Figure 4:
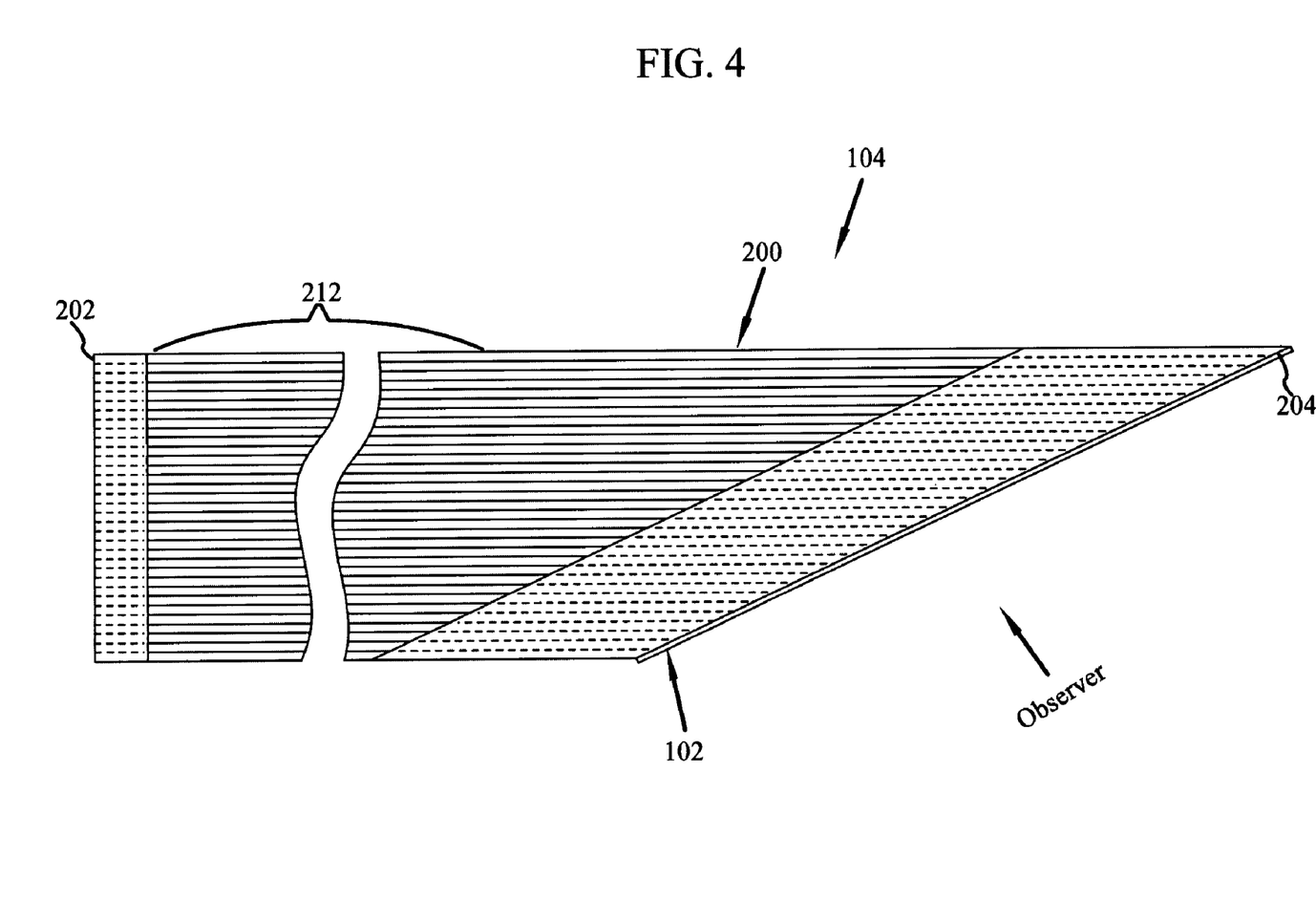
FIG. 4 shows a plane view of a magnifying layer and a fractional coverage louver device incorporated in the display shown in FIG. 1.

As shown in FIG. 4, each magnifying layer 104 has a plurality of light guides 200. Shown for the ease of illustration and discussion are thirty-three light guides 200. Embodiments may employ more or fewer light guides 200. The plurality of magnifying output ends 204 are aligned in substantially contiguous parallel contact.

More specifically, the magnifying output ends 204 of the light guides 200 in layer 104 are in substantially contiguous intimate contact, without intervening spacers or material separating each individual magnifying output end 204 from its neighbors on either side. In other words, the magnifying output ends 204 lie next to one another and are in actual contact, touching along their outer surfaces at a point. It is understood and appreciated that the light conveying cores 208 of each light guide 200 are not in contact, rather it is the outer surface of the clad 210 that is in contact.

FIG. 4 also shows a fractional coverage louver device 102 disposed upon the aligned output ends 204. Fractional coverage louver device 102 advantageously reduces the loss of light and improves the viewing angle provided to an observer. In addition, in at least one embodiment fractional coverage louver device 102 advantageously reduces the amount of ambient light reflected back towards an observer.

Figure 5:
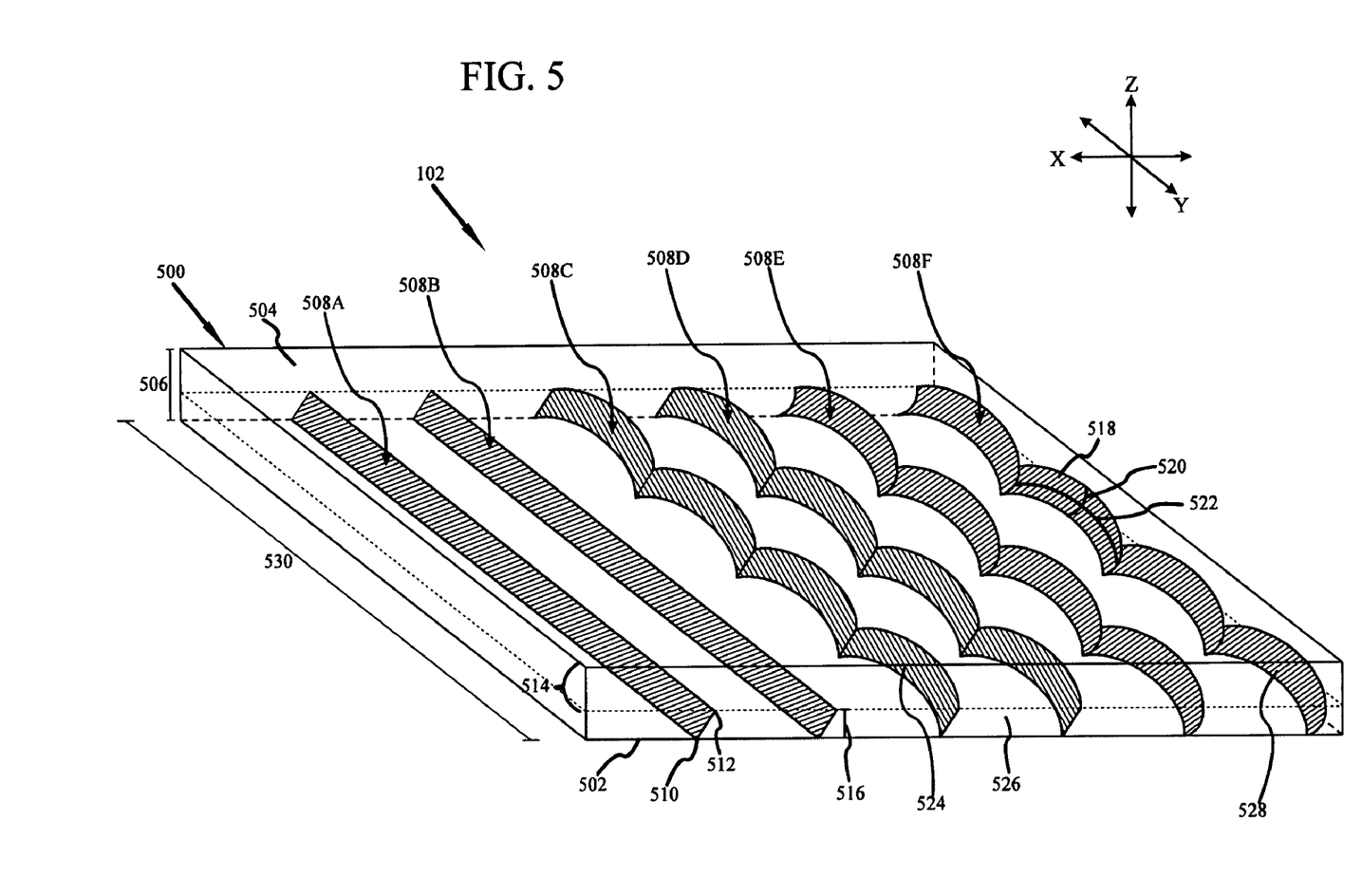
FIG. 5 shows a partial perspective view of a fractional coverage louver device embodying different louver members.

The nature of the fractional coverage louver device 102 is further shown in FIGS. 5 through 11. FIG. 5 conceptually illustrates an enlarged partial perspective view of fractional coverage louver device 102. Fractional coverage louver device 102 consists of a transparent layer 500 of material having a first surface 502 and parallel thereto a second surface 504, and a width 506 therebetween.

A plurality of louver members 508 are disposed within the transparent layer 500, specifically, exemplary louver members 508A~508F. Each louver member 508 has a first end 510 and a second end 512. As shown, the first end 510 of each louver member is adjacent to the first surface 502. The second end 512 of each louver member is proximate to the second surface 504, and defines a space 514 between the second end 512 and the second surface 504. Moreover each louver member 508 has a vertical component 516 normal to first surface 502, the vertical component 516 being a fraction of width 506.

As used herein, the term "transparent" is generally defined to include the definitions of "capable of transmitting light so that objects or images can be seen as if there were no intervening material," and "easily seen through." In at least one embodiment, transparent layer 500 may be aptly described as translucent, in that transparent layer 500 may be colored, polarized and/or intentionally diffusing.

Figures 9, 10, 11:
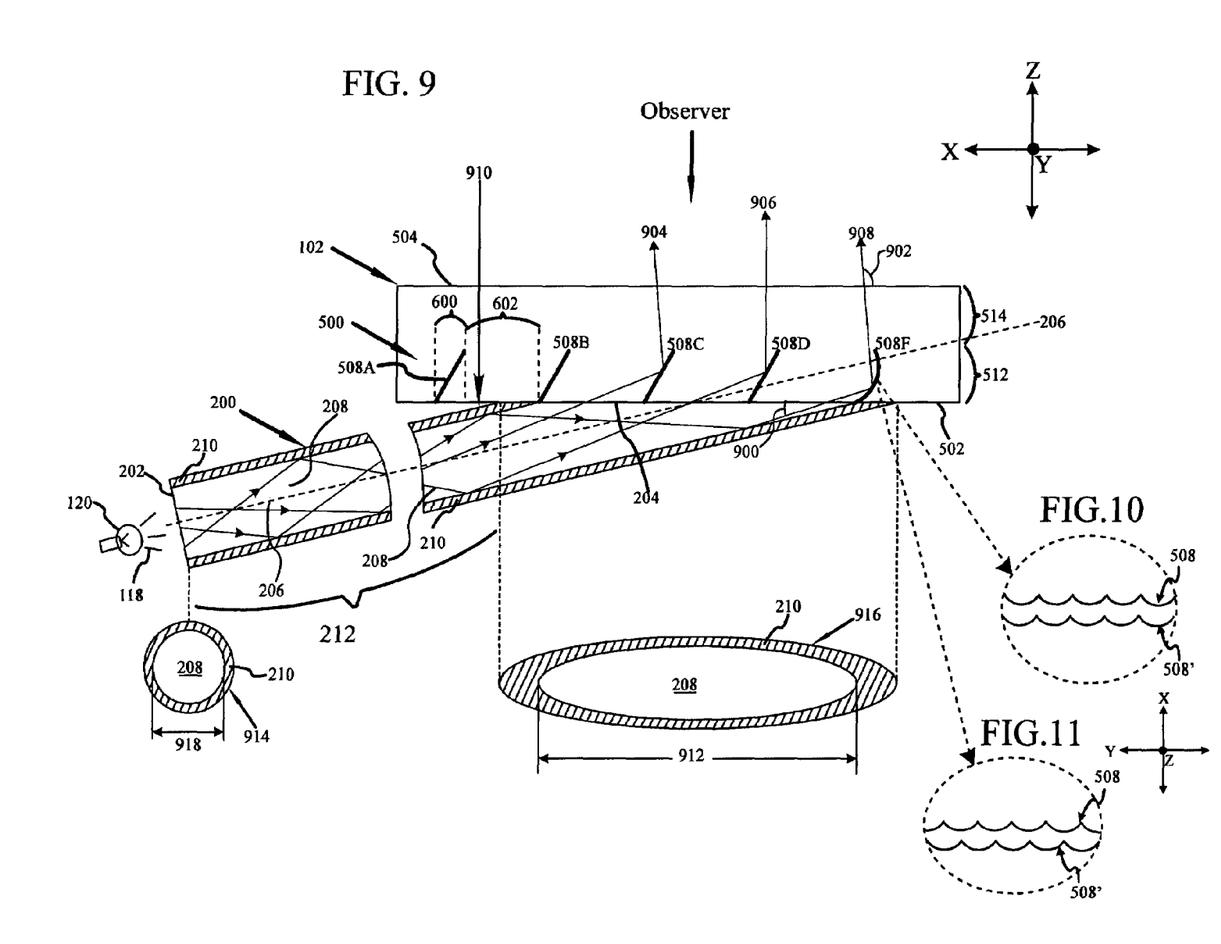
FIG. 9 is a partial cross-sectional view of a light guide with an attached fractional coverage louver device.
FIG. 10 shows parallel rows of louver members in one embodiment.
FIG. 11 shows staggered rows of louver members in an alternative embodiment.

The louver members 508 are aligned to receive light entering the first surface 502 at a shallow angle relative to the first surface 502 and direct the light out the second surface 504 at a high angle relative to the second surface 504 (see FIG. 9). Each louver member 508 has a surface 518 having at least one first curvature 520 along a first axis (e.g., Z-axis) an at least one second curvature 522 along a second axis (e.g., Y-axis) transverse to the first axis. For each curvature 520, 522, a larger curvature provides a corresponding larger angle of dispersion for the redirected light received from the first surface 502, and redirected through the second surface 504.

The louver members 508 may take many forms. Exemplary louver members 508A~508B are substantially flat members. Exemplary louver members 508C~508D include cylindrical mirror sections, e.g., a mirror segment 524 of louver member 508C has a curved cross-section along the first surface 502 and a straight cross-section along a side 526 of transparent layer 500. Exemplary louver members 508E~508F include elliptical mirror segments, e.g., mirror segment 528 of louver member 508F has a curved cross-section along the first surface 502 and a curved cross-section along side 526. Moreover, in at least one embodiment, the louver members 508 are shaped louver members. Shaped louvers are described in U.S. Pat. No. 7,397,984 entitled "Light Guide Screen Louver Device" filed on the same date of Nov. 1, 2005 and by the same inventors as the present disclosure, which is herein incorporated by reference.

Figure 12:
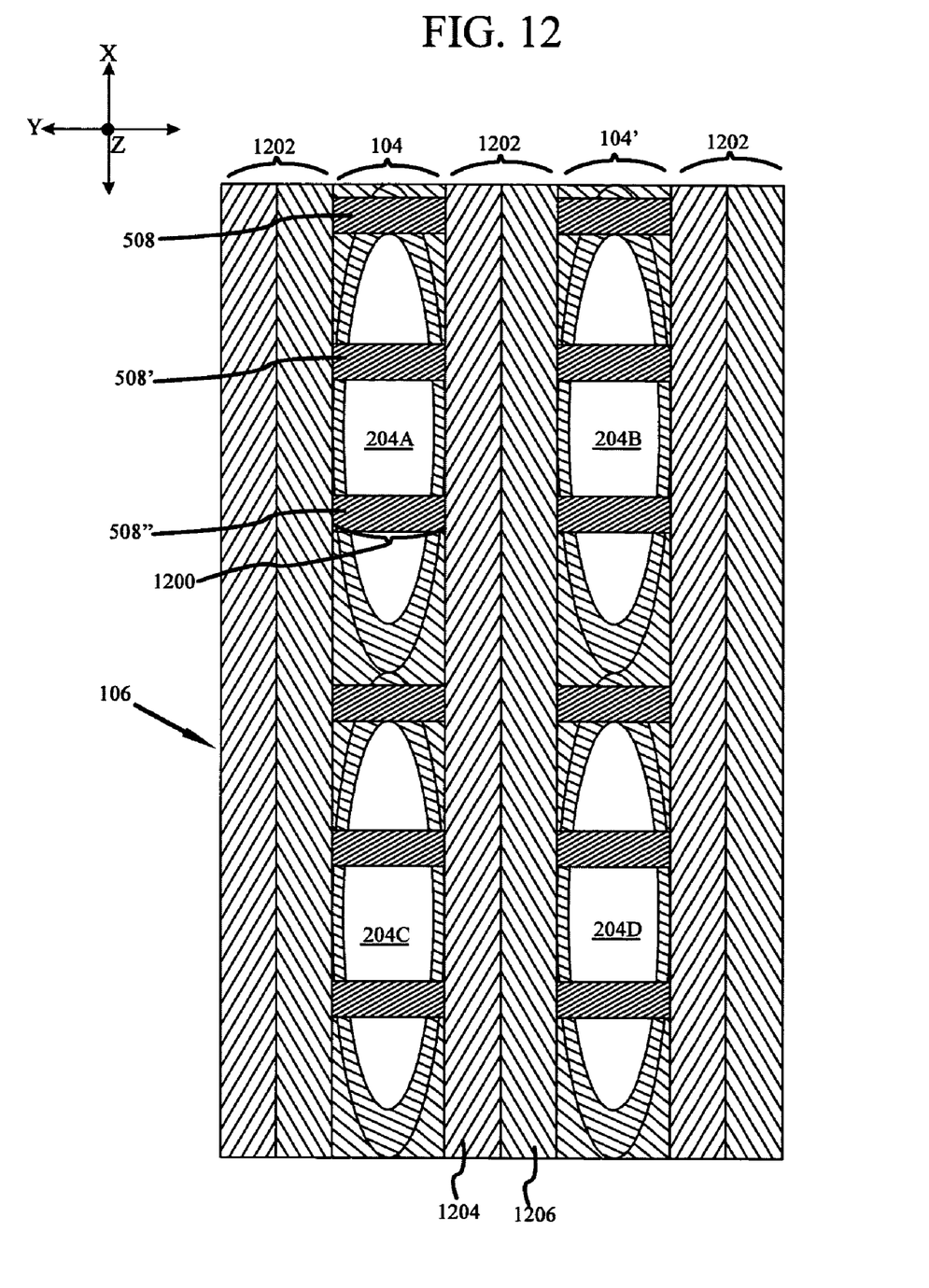
FIG. 12 is an enlarged partial view of the viewing surface of a light guide screen, showing partial rows of louver members across output ends in yet another alternative embodiment.

With respect to FIG. 5, louver members 508C~508F are each illustrated as having four sections for ease of discussion and illustration. It is to be understood that each louver member may have one section or, as shown, may consist of many identifiable sections. Moreover, in at least one embodiment, each segment, e.g., 524 or 528, is a separate identifiable louver member. In addition, each louver member 508 may have a length about equal to the length 530 of transparent layer 500, or a fraction thereof. Moreover, each louver member 508 may span across multiple light guide output ends 204 or a single light guide output end 204 as shown in FIG. 12.

In at least one embodiment, the louver members 508 within fractional coverage louver device 102 are substantially identical. In yet another alternative embodiment the louver members 508 within fractional coverage louver device 102 may be different from one to another, such as for example a mixture of flat and shaped louvers having elliptical and/or cylindrical mirror segments, and/or a mixture of louvers with different sized elliptical and/or cylindrical mirror segments with flat louvers. In other words, in at least one alternative embodiment the plurality of louver members 508 may be sub-grouped, each sub-group consisting of at least one louver member. In such a configuration, the one or more members within each sub-group are substantially identical, but different from the members of another subgroup.

In at least one embodiment, louver members 508 are physically reflective surfaces. More specifically, in one embodiment each louver member 508 is a light reflective material or is established from a light reflective material such as metal (for example, without limitation, silver or aluminum). Whether a physical structure or a coated structure, the light reflective material is sufficiently thick so as to be non-light transmissive. In an embodiment utilizing silver, the thickness of the silver material may be about one-thousand angstroms thick. The surfaces of louver members 508 may also be textured.

In an alternative embodiment, louver members 508 are established from a light transmissive material having a different index of refraction from transparent layer 500. As the indices of refraction are different, louver members 508 will bend and/or reflect light in specific ways depending on the angle of incidence of light provided through first surface 502.

In yet another alternative embodiment, louver members 508 are coated with a holographic film, or textured so as to provide physical relief holograms. In at least one such embodiment, these are holograms of mirror segments and serve to further enhance the dispersion of light though the second surface 504 to an enhanced viewing zone.

Louver device 102 may be fabricated in whole or in part by a variety of methods. A method of making a similar louver device 102 is described in U.S. patent application Ser. No. 11/052,612, filed Feb. 7, 2005, and published as 2006/0176556 on Aug. 10, 2006, entitled "Method of Making A Louver Device for A Light Guide Screen," which is herein incorporated by reference. Various types of louver devices 102 are described in U.S. patent application Ser. No. 11/052,605, filed Feb. 7, 2005, and published as 2006/0176554 on Aug. 10, 2006, entitled "Holographic Louver Device for A Light Guide Screen," which is also herein incorporated by reference.

Figure 6:
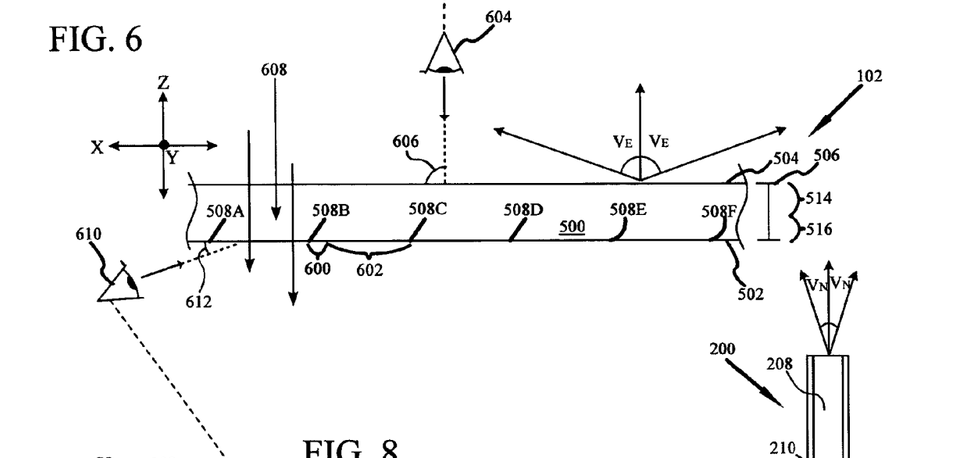
FIG. 6 provides a side view of the fractional coverage louver device in FIG. 5 and relative angles of approach.
Figure 7:
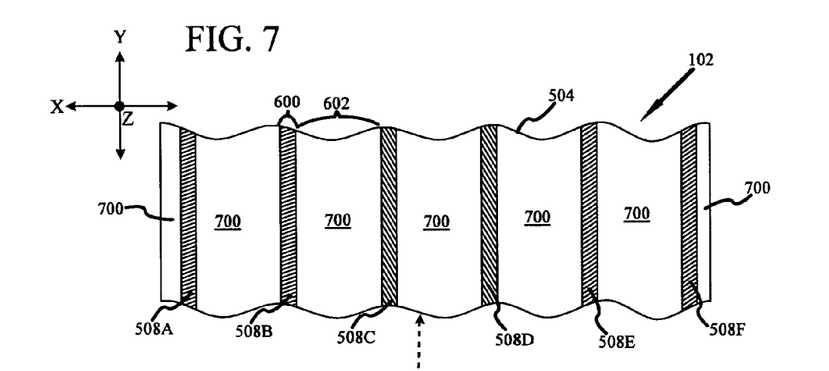
FIG. 7 is a top view of the fractional coverage louver device shown in FIG. 6, from a high angle of approach showing the fractional coverage of the louver members.
Figure 8:
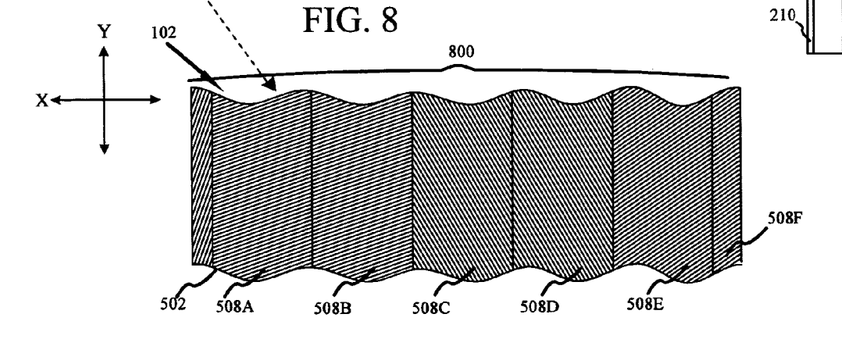
FIG. 8 is a bottom view of the fractional coverage louver device shown in FIG. 6, from a low angle of approach showing the apparent continuous reflective surface provided by the louver members.

FIGS. 6~8 conceptually illustrate the fractional coverage aspect of louver device 102. More specifically, FIG. 6 provides a side view of louver device 102 showing cross-sections of exemplary louver members 508A~508F shown in FIG. 5. As is appreciated with respect to louver member 508B, louver member 508B does not extend from the first surface 502 to the second surface 504 as vertical component 516 is a fraction of the width 506 of transparent layer 500. In addition, the horizontal component 600 of louver member 508B does not abut that of louver member 508C; rather, space 602 exists between the louver members 508 (along the X-axes, as illustrated). This spacing advantageously achieves different results depending on the approach angle.

More specifically, an observer eye 604 is illustrated in front of louver device 102, much as an observer would be when viewing an LGS 100 with fractional coverage louver device 102. As illustrated in FIG. 7, the area occupied by louver members 508 is a fraction of the total area of louver device 102. As may be appreciated with respect to FIG. 7, transparent areas 700 exist between each louver member 508. In other words, relative to a high angle 606 of approach to the second surface 504, the louver members 508 provide a fractional reflective area. As such, a portion of incident ambient light 608 will pass through louver device 102 and thus not be reflected back to observer eye 604 (see FIG. 6). As such, louver device 102 has advantageous light room contrast properties.

As illustrated by eye 610 and FIG. 8, this fractional coverage does not reduce the advantageous redirection properties for light provided by light guides to first surface 502. More specifically, eye 610 is oriented at a low angle 612 relative to first surface 502. This angle 612 is representative of the delivery angle of light provided by at least one light guide to the first surface 502 as shown in FIG. 9. As illustrated in FIG. 8, the low angle 612 shown in FIG. 6 permits the louver members 508 to appear as a solid reflective surface 800. In other words, the louver members 508A~508F present a continuous reflective surface 800 relative to a low angle of approach to the first surface 502.

Moreover, the hatching of louver members 508A~508F in FIG. 8 corresponds to the hatching illustrated for the same louver members 508A~508F in FIG. 7 and FIG. 5. The transparent areas 700 evident between louver members 508A~508F in FIG. 7 due to the high angle of approach, are substantially, if not entirely hidden due to the low angle of approach represented in FIG. 8.

Moreover, as stated above, for a typical light guide such as an optical fiber, the spread of light to either side of longitudinal centerline is typically about thirty degrees (30°). In other words the angular viewing range provided by light guide 200 is typically narrow, see angle $V_N$ shown in FIG. 6. In at least one embodiment, the height of louver members 508 is selected to accommodate the spread of $V_N$ from light guide 200. Fractional coverage louver device 102 advantageously increases the angular viewing range. In at least one embodiment, this improved viewing angle is about 60°~80° in the horizontal direction (e.g., angle $V_E$ shown in FIG. 6) and about 25°~40° in the vertical direction. Such an improved viewing angle permits a larger audience viewing zone for observers to view and enjoy LGS 100.

FIG. 9 illustrates a cross-section of louver device 102 upon a single light guide 200. Louver members 508A~508F are again provided and correspond to like-numbered louver members in FIGS. 5 through 8. As shown, in at least one embodiment louver members 508 are aligned to receive light 118 entering the first surface 502 at a low angle 900 relative to first surface 502 and re-direct light 118 out the second surface 504 at a high angle 902 relative to the second surface 504. As such, in FIG. 9 all three illustrated light arrows 904, 906, 908 are traveling generally towards the viewing observer. Louver device 102 advantageously enhances contrast as substantially all of the light 118 provided to first surface 502 by output end 204 is redirected through second surface 504 towards an observer.

The fractional coverage of louver members 508 further enhances contrast as ambient light (shown as arrow 910) incident upon the second surface 504 has a greater opportunity to pass through transparent areas 700 of louver device 102 than to strike a louver member 508 (see FIG. 7). Ambient light 910 may pass between light guides 200 and be absorbed by black materials within the LGS 100 display, or even by black matrix material provided between and around light guides 200. Moreover, in at least one embodiment of an LGS 100 with fractional coverage louver device 102, the LGS is a black matrix light guide screen display as is described in U.S. Pat. No. 7,324,278 entitled "Black Matrix Light Guide Screen Display", filed Feb. 7, 2005 and incorporated herein by reference.

The image presented by the viewing surface 106 to an observer of LGS 100 is composed of a plurality of pixels. With respect to FIG. 9, the output end 204 of each light guide 200 may define the length and/or height of each pixel. The cross-sectional view provided in FIG. 9 shows the cross-section dimension 912 of a single pixel.

In addition to conveying the image light from the input end 202 to the output end 204, light guide 200 is structured and arranged to enlarge the image. More specifically, input end 202 is substantially perpendicular to longitudinal centerline 206. Output end 204 is angled relative to longitudinal centerline 206 at angle 900. As such, the cross-section dimension of input end 202 is not as great as the cross-section dimension of output end 204. In the conceptual embodiment shown in FIG. 9, input end 202 has a substantially circular cross-section 914, and output end 204 has a substantially elliptical cross-section 916. As such, the diameter 918 of input end 210 is smaller than the cross-section dimension 912 of output end 204.

So as to effectively redirect light 118 from output end 204 to an observer, the louver members 508 are aligned to transversely cross output end 204. Output ends 204 repeat with periodicity in providing the viewing surface 106 of LGS 100. The louver members 508 also repeat with periodicity. In at least one embodiment, louver members 508 are spaced at regular intervals over the light guides 200 of each layer along the X-axes as shown in FIG. 9.

When two periodic structures are close to the same periodicity or simple fractions thereof and disposed proximate to one another, visible fringe patterns may occur. In at least one embodiment, the potential for such fringe patterns may be significantly reduced by spacing louver members 508 at intervals about one-third the cross-sectional dimension 912 of each pixel. Such an interval is optimal for pixel resolution with reduction in fringing patterns. There is little change if the intervals are smaller. However, as intervals approach ½ or more of the pixel size, fringing patterns become problematic and resolution can be degraded.

FIGS. 10 and 11 show conceptually different embodiments with respect to how the louver members 508, 508' are arranged with respect to the Y-axis. FIG. 10 illustrates the cross-section of two louver members arranged in parallel rows. FIG. 11 illustrates two similar cross-sections, however in contrast to the parallel row arrangement in FIG. 10, in FIG. 11, the louver members 508, 508' are arranged in staggered rows. It is to be understood and appreciated that the illustrations of cross-sections as a plurality of curved elements is not suggestive of a limitation. Indeed other geometries and configurations may be employed, including but not limited to flat, trapezoidal, angular as well as continuous louver members having a plurality of segments or individual louver members having only one segment.

FIG. 12 shows yet another embodiment of arranging louver members 508 with respect to the Y-axis. FIG. 12 presents an enlarged partial view of viewing surface 106. As shown, louver members 508 (shown as 508, 508', 508") are aligned to cross output ends 204A, but are not continuous in the Y-direction. More specifically, louver members 508 have a length 1200 sufficient to cross the active output ends 204 of the light guides and do not cover the dead space 1202 (e.g. spacers 1204, 1206) therebetween. As such, in at least one embodiment, louver members 508 provide fractional reflective coverage across the length 530 of the transparent layer 500 (not shown in FIG. 12, see FIG. 5).

As spacers 1204, 1206 are composed of substantially nonreflective material, and in at least one embodiment are formed from black matrix material, ambient light incident upon the dead space 1202 is not reflected in any direction. Moreover, in at least one embodiment incident light upon dead space 1202 is absorbed.

Although shown as substantially identical rectangles for ease of illustration, it should be understood and appreciated that louver members 508 may be structured and arranged so as to cover substantially only each output end 204, and not the glue or other bonding or filler material adjacent to each output end 204.

Minimizing the amount of reflective material provided by louver members 508 to substantially only the active output ends 204 is advantageous in enhancing the contrast properties of the LGS 100. For example, where the magnification of the output end 204 over the input end 202 is ten-to-one (10:1) and the output ends 204 are elliptical, there is a ten-to-one (10:1) ratio between the major and minor axes of output end 204. This results in dead space between one light guide layer 104 and the next that is ninety percent (90%) of the pixel pitch.

In at least one embodiment, the index of refraction for transparent layer 500 is substantially the same as the index of refraction of the light guide cores 208 establishing the output face 116 of LGS 100. As such, when louver device 102 is joined to output ends 204, there is no apparent boundary to disrupt or alter the path of light as it travels from the light guides 200 and into the first surface 502 to encounter a louver member 508. Moreover, a substantially boundaryless union exists between output ends 204 and transparent layer 500.

A boundaryless union may be achieved by coupling louver device 102 directly to output ends 204 such that substantially no intervening gap or space between the two structures exists. In at least one embodiment, to establish this boundaryless union, a joining agent is selected, for example, glue having a matched index of refraction.

In at least one embodiment, first surface 502 is configured to permanently join to the aligned output ends 204 as part of LGS 100, such as by a substantially transparent glue with a matched index of refraction. In an alternative embodiment, louver device 102 is configured to removably attach to LGS 100 such as by snaps, a tongue-and-grove system, magnets, Velcro™, screws or other such appropriate non-permanent attachment device.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A fractional coverage louver device for a light guide screen, comprising:
    a single transparent layer of material having a first surface and, parallel thereto, a second surface, and a width therebetween; and
    a plurality of reflective louver members disposed within the transparent layer of material, each louver member having a first end and a second end, the first end adjacent to the first surface, the second end proximate to the second surface and defining a space between the second end and the second surface, each louver having a width and each louver angled to provide a horizontal component greater than the width, wherein the louver members present a fractional reflective area relative to a high angle of approach to the second surface.

2. The louver device of claim 1, wherein the louver members provide fractional reflective coverage across the width of the transparent layer.

3. The louver device of claim 1, wherein the transparent layer has a length, each louver member having a length less than the transparent layer length, such that the louver members provide fractional reflective coverage across the length of the transparent layer.

4. The louver device of claim 1, wherein the louver members present a continuous reflective area relative to a low angle of approach to the first surface.

5. The louver device of claim 1, wherein the louver members are aligned to receive light entering the first surface at a shallow angle relative to the first surface and direct the light out the second surface at a high angle relative to the second surface.

6. The louver device of claim 1, wherein the louver members are physically reflective surfaces.

7. The louver device of claim 1, wherein the louver members are arranged in parallel rows.

8. The louver device of claim 1, wherein the louver members are shaped.

9. The louver device of claim 1, wherein each louver members is a cylindrical or elliptical mirror segment.

10. A fractional coverage louver device for a light guide screen, comprising:
  a single transparent layer of material having a first surface and, parallel thereto, a second surface, and a width therebetween;
  a plurality of reflective louver members disposed within the transparent layer of material adjacent to the first surface and extending at a non-perpendicular angle toward the second surface across a fraction of the width of the transparent layer.

11. The louver device of claim 10, wherein the louver members present a fractional reflective area relative to a high angle of approach to the second surface.

12. The louver device of claim 10, wherein the transparent layer has a length, each louver member having a length less than the transparent layer length, such that the louver members provide fractional reflective coverage across the length of the transparent layer.

13. The louver device of claim 10, wherein the louver members present a continuous reflective area relative to a low angle of approach to the first surface.

14. The louver device of claim 10, wherein the louver members are aligned to receive light entering the first surface at a shallow angle relative to the first surface and direct the light out the second surface at a high angle relative to the second surface.

15. The louver device of claim 10, wherein the louver members are physically reflective surfaces.

16. The louver device of claim 10, wherein the louver members are arranged in parallel rows.

17. The louver device of claim 10, wherein the louver members are shaped.

18. The louver device of claim 10, wherein each louver member is a cylindrical or elliptical mirror segment.

19. The louver device of claim 10, wherein each louver member has a first end and a second end, the first end adjacent to the first surface, the second end defining a space between the second end and the second surface.

20. A fractional coverage louver device for a light guide screen, comprising:
  a single transparent layer of material having a first surface and, parallel thereto, a second surface, and a width therebetween;
  a light redirection means for receiving light presented through the first surface at a first angle with a low angular range and increasing the angular range as the light is directed through the second surface at a plurality of angles relative to the second surface, the light redirection means disposed within the transparent layer adjacent to the first surface and occupying a fraction of the width, the light redirection means extending towards the second surface at a non-perpendicular angle.

21. The louver device of claim 20, wherein the means for receiving light and increasing angular range is a louver member.

22. A light guide display comprising:
  a case;
  a plurality of aligned magnifying layers within the case, each magnifying layer including a plurality of light guides, each light guide having a light transmitting core and an index of refraction, each light guide having an input end and an output end, the plurality of output ends collective grouped as an output location, the plurality of input ends collectively grouped as an input surface;
  a transparent layer of material having a first surface adjacent to the output location and parallel thereto a second surface, and a width therebetween, the transparent layer of material having an index of refraction matched to the index of refraction of the light guide core;
  a plurality of louver members disposed within the transparent layer of material, each louver member having a first end and a second end, the first end adjacent to the first surface, the second end proximate to the second surface and defining a space between the second end and the second surface wherein the louver members present a fractional reflective area relative to a high angle of approach to the second surface; and
  at least one image source proximate to the input surface.

23. The light guide display of claim 22, wherein each louver member is structured and arranged to accept light entering from the first surface with a narrow angular viewing range and provide the light through the second surface with an increased angular viewing range.

24. The light guide display of claim 22, wherein the louver members present a continuous reflective area relative to a low angle of approach to the first surface.

25. The light guide display of claim 22, wherein the louver members provide fractional reflective coverage across the width of the transparent layer.

26. The light guide display of claim 22, wherein the transparent layer has a length, each louver member having a length sufficient to transversely cross the output end adjacent to the louver, such that the louver members provide fractional reflective coverage across the length of the transparent layer.

* * * * *

UNITED STATES PATENT AND TRADEMARK OFFICE
CERTIFICATE OF CORRECTION

PATENT NO. : 7,535,638 B2 Page 1 of 1
APPLICATION NO. : 11/263816
DATED : May 19, 2009
INVENTOR(S) : Huei Pei Kuo et al.

It is certified that error appears in the above-identified patent and that said Letters Patent is hereby corrected as shown below:

On the title page, item (75), in "Inventors", in column 1, line 2, delete "Lawrence" and insert -- Laurence --, therefor.

Signed and Sealed this

Twenty-second Day of September, 2009

David J. Kappos
*Director of the United States Patent and Trademark Office*